(12) United States Patent
Kamdem et al.

(10) Patent No.: US 7,998,008 B2
(45) Date of Patent: Aug. 16, 2011

(54) POWER TRANSMISSION PULLEY

(75) Inventors: Henri Kamdem, Amboise (FR); Claude Rointru, Saint Etiennede de Chigny (FR)

(73) Assignee: Hutchinson, Paris (FR)

( * ) Notice: Subject to any disclaimer, the term of this patent is extended or adjusted under 35 U.S.C. 154(b) by 614 days.

(21) Appl. No.: 11/342,576

(22) Filed: Jan. 31, 2006

(65) Prior Publication Data
US 2007/0066426 A1    Mar. 22, 2007

(30) Foreign Application Priority Data
Sep. 19, 2005   (FR) ...................................... 05 09558

(51) Int. Cl.
*F16H 29/00*   (2006.01)
*F16H 35/12*   (2006.01)

(52) U.S. Cl. ............................ 474/94; 474/902; 474/161

(58) Field of Classification Search ............... 474/135, 474/70, 161, 94, 166, 170, 902; 192/45, 192/45.1, 46, 110 B, 55.51, 55.3; 123/198 R
See application file for complete search history.

(56) References Cited

U.S. PATENT DOCUMENTS

| | | | |
|---|---|---|---|
| 4,196,799 A * | 4/1980 | Taylor et al. ................. | 192/48.6 |
| 4,725,259 A | 2/1988 | Miyata | |
| 5,139,463 A * | 8/1992 | Bytzek et al. ................. | 474/69 |
| 5,234,089 A | 8/1993 | Itomi et al. | |
| 5,676,225 A | 10/1997 | Miyata | |
| 5,788,576 A * | 8/1998 | Varin ............................. | 464/83 |
| 6,044,943 A * | 4/2000 | Bytzek et al. ................. | 192/41 R |
| 6,083,130 A * | 7/2000 | Mevissen et al. ............. | 474/70 |
| 6,394,248 B1 | 5/2002 | Monahan et al. | |
| 7,070,033 B2 * | 7/2006 | Jansen et al. ................. | 192/41 S |
| 2005/0092574 A1 * | 5/2005 | Tanaka ........................... | 192/45 |
| 2005/0215366 A1 * | 9/2005 | Serkh ............................. | 474/74 |
| 2005/0250607 A1 * | 11/2005 | Jansen et al. ................. | 474/74 |
| 2006/0035736 A1 * | 2/2006 | Umeda et al. ................. | 474/70 |
| 2008/0108442 A1 * | 5/2008 | Jansen et al. ................. | 464/54 |

FOREIGN PATENT DOCUMENTS

| | | |
|---|---|---|
| EP | 1 279 807 A1 | 1/2003 |
| EP | 1 316 740 A2 | 6/2003 |
| JP | 2005-163932 | 6/2005 |
| WO | WO 03/048606 A1 | 6/2003 |

\* cited by examiner

*Primary Examiner* — Robert Siconolfi
*Assistant Examiner* — Anna Momper
(74) *Attorney, Agent, or Firm* — Clark & Brody

(57) ABSTRACT

The invention relates to a power transmission pulley comprising a pulley element having a ribbed outer outline that is adapted to receive a ribbed belt, and a resilient element interposed between the pulley element and a receiver device for coupling to a member driven by the belt. The pulley includes a freewheel device disposed in series with the resilient element between the pulley element and said receiver element.

15 Claims, 5 Drawing Sheets

POWER TRANSMISSION PULLEY

The present invention relates to a power transmission pulley usable to decouple an accessory, such as an alternator, that presents variations in velocity leading to variations in torque. These variations in speed may be cyclical, for example, or else they may be in the form of jolts, or indeed in the form of decelerations or accelerations.

BACKGROUND OF THE INVENTION

In the automotive field, there exist several types of power transmission pulley enabling accessories to be decoupled.

A first type is constituted by freewheel pulleys that transmit power in one direction only and provide decoupling by over-running in the opposite direction so as to enable velocity differences to exist between the driving portion and the driven portion. The balls, cams, or needles that mesh are made of metal, so they are rigid and thus provide coupling that is rigid.

The inner portion is preferably in the form of a cam suitable for wedging against connection elements so as to transmit torque.

Such pulleys are described in particular in U.S. Pat. Nos. 4,725,259 and 5,676,225.

During the decoupling stages that occur in the event of the outer portion decelerating quickly, the inner portion driven by pure inertia maintains a high velocity in the total absence of contact. The velocity difference between the outer driving element and the inner driven element can be sufficiently great to lead to a phenomenon of excess speed.

FIG. 2 of U.S. Pat. No. 4,725,259 (reproduced herein as FIG. 1) shows the fluctuation of the velocity over time, the velocity of the outer portion being drawn as a continuous line while the velocity of the inner portion is drawn as a dashed line.

When the velocity of the outer portion fluctuates rapidly, the driven system is thus disconnected and then reconnected with the outer portion:

if there is no friction, the velocity of the inner element is almost constant;

if there an opposing torque, the velocity of the inner element fluctuates a little; and the level of velocity fluctuation presented by the inner (driven) portion depends on its deceleration, and thus on its opposing torque, and this deceleration can be very large if the opposing torque is high (e.g. when an alternator is delivering electricity at its maximum rate).

There exist freewheels in which the drive motion comes from the inner portion, for which the explanation above remains valid, but should be inverted.

A freewheel pulley presents several drawbacks:

1) In coupled mode, the balls are wedged between the outer portion and the inner portion. While coupling is being established (at P), the rigid mechanical contact generates an impact, leading to an instantaneous rise in force. Once coupled, the freewheels transmits all of the motion from the driving portion, possibly together with additional jolting.

This has the consequence of imparting dynamic forces to the transmission, whether by belt, chain, gears, or direct, and leads to associated damage (slip, fatigue, wear).

2) FIG. 1 shows alternation between two modes of operation at a high frequency. The deceleration of the driven portion depends on the opposing torque: the greater the opposing torque, the harder the deceleration, and as a result the deceleration follows the motion of the driving portion more closely.

When the opposing torque is due to the driven member (alternator, converter, rotary machine, tool, etc.) taking power, its motion follows the motion of the driving portion almost exactly. Under such circumstances, the dynamic acceleration/deceleration forces are transmitted in full (slip, fatigue, wear).

The situation can be summed up as follows: if the member delivers an opposing torque (or if the amplitude of the fluctuation is small), then the freewheel remains blocked and never switches to unclutched mode.

For a V-grooved motor vehicle belt driving an alternator on a diesel engine:

while the engine is running at slow speed, its velocity fluctuates by as much as ±20% at a frequency of 30 hertz (Hz);

the belt picks up this motion from a drive pulley (crank shaft pulley) and conveys it to the alternator;

the alternator is driven via a freewheel, and this freewheel disconnects the inertia on each deceleration, and it reconnects it on each acceleration;

if electricity is taken from the alternator, then its torque reaches 10 newton meters (Nm) to 15 Nm, which suffices to brake the over-running stage, so the freewheel remains in coupled mode and no longer disconnects the alternator; and if the freewheel unlocks, then on the next acceleration its locking is sudden and causes the belt to slip.

Because of its inertia, the alternator thus creates dynamic torque that increases with increasing fluctuation, thus leading successively to belt slip, abrasion, noise, and/or fatigue in the bearings.

A second type is constituted by pulleys having resilient elements, with an element that is flexible in twisting being interposed between the outer portion and the inner portion. This element is in the form of a ring, a disk, a spring, pads, etc. The stiffness of this element is dimensioned as a function of the torque to be transmitted under static and under dynamic conditions. The resilient element can deform so as to absorb variations in torque, but it cannot accommodate differential rotation between the driving portion and the driven portion.

One category of pulleys with resilient elements is the so-called "decoupler" pulley of stiffness that is selected to filter all velocity variations above certain excitation frequency.

FIG. 2 shows an example of a known resilient pulley, and FIG. 3 shows its frequency response, where fr is its resonant frequency (in revolutions per minute (rpm)) and fc is its cutoff frequency (in rpm). Amplitude is plotted in decibels (dB) up the ordinate in the form of a filter ratio, with the 0 dB level corresponding to the amplitude at the cutoff frequency fc.

The transmission pulley shown in FIG. 2 presents a pulley element having an outer outline 1 adapted to the profile of the ribs of a ribbed V-belt. The pulley element rotates about a bearing 2 and presents an extension 1' secured via a part 7' of outer outline 6' of a rubber body 6 whose inner outline is secured via another part 7" to a part 3 which provides the connection with a receiver shaft, e.g. of an alternator.

Pulleys of this type can only oscillate about a mean position, since the connection between the outside and the inside is permanent.

The ratio between the amplitudes of the fluctuation of the (outer) driving portion and the (inner) driven portion varies a function of the frequency of the fluctuation.

In association, the stiffness and the inertia to be driven constitute a resonant system. Above the cutoff frequency fc of the resilient pulley, the driven inner portion fluctuates less than the driving outer portion.

These pulleys also present several drawbacks:

1) A first drawback is due to the fact that they also present a bearing (generally based on polytetrafluoroethylene (PTFE)) which supports radial forces. This friction impedes filtering since it creates an adhesion threshold below which the pulley remains stationary (and thus rigid).

2) If the velocity fluctuation is at a frequency well below the resonant frequency fr, or if jolting is progressive, then the elastic element deforms very little and the force is transmitted. The frequency spectrum (see FIG. 3) needs to be very well known at design time, since otherwise the elastic pulley can be inoperative.

3) If the velocity fluctuation is at a frequency higher than the cutoff frequency fc or if the jolt is brief, then the elastic element deforms. This deformation occurs in both directions; the energy stored in the positive direction is restored by resilient return in the opposite direction, and so on. This leads to heating and to damage of the pulley.

4) If the velocity fluctuation is at a frequency that is very close to the resonant frequency fr (see FIG. 3), then the resilient pulley amplifies the fluctuation (filter ratio>0 dB). This produces an effect that is contrary to the desired effect. This amplification is accompanied by very high levels of deformation in both directions; the energy stored in the positive direction is restored by resilient return in the opposite direction and so on. This also leads to heating and to damage.

Consider an application to a motor vehicle in which:

The engine (having N=4 cylinders) is running at low speed (idling at $V_m$=900 rpm) and its velocity is fluctuating at up to ±20% at a frequency $F_{exc}$ of 30 Hz.

It should be recalled that $F_{exc}=V_m N/120$.

The alternator is driven by a decoupler pulley which is supposed to perform filtering from 700 rpm (23.3 Hz).

The idling speed is $V_m$=900 rpm ($F_{exc}$=30 Hz), so the pulley filters properly.

Because of this absorption, the elastic element (made of rubber) deforms by close to ±20°, heats up, hardens, and can break quickly.

On starting, the engine goes quickly from a zero velocity to an idling speed (900 rpm). It thus finds itself for a short length of time at the resonant frequency fr. At this instant, the deformation altitude of the rubber element can reach ±40° and it can break very quickly if starting is repeated several times over.

Finally, if the engine decelerates suddenly or stalls, the belt which is connected to the crank shaft stops revolving, but the alternator continues to revolve because of its inertia. The belt is thus suddenly stretched and then unstretched, snapping back to shape.

A third type of pulley is constituted by resilient clutch pulleys using springs.

In a resilient clutch pulley, e.g. as described in U.S. Pat. No. 6,083,130 (represented by its FIG. 2 reproduced herein as FIG. 4), a primary torsion spring 88 is interposed between the outer portion 120 and the inner portion 52, with the spring providing a clutch function by expanding radially. The clutch is subsequently connected to the resilient element which may be a second torsion spring 85-86.

When the primary spring contracts, there is excess pressure in the connection between the driving portion and the driven portion. Nevertheless, there is a friction threshold which maintains the connection, thus leading to a slip phenomenon.

In the direction in which the primary spring expands, that leads to a strong connection, and the resilient element (in this case a spring) takes over to transmit the forces.

Above a certain angle of twist, the resilient element can no longer deform (turns touching). The spring must therefore be very stretched out which increases the axial length of the pulley and thus its bulk.

The ball bearings 118 operate with a large offset which reduces their lifetime. In order to take up a fraction of the radial forces, a PTFE bearing 110-112 is interposed at the end opposite from the ball bearing. This PTFE bearing generates friction which is added to that of the clutch and reduces efficiency in unlocked mode.

A variant of this third type of pulley is described in U.S. Pat. No. 6,394,248, in particular in FIGS. 2 and 3 thereof which are reproduced herein as FIGS. 5a and 5b. The principle of the expanding spring 22 is conserved. However, the resilient element is a succession of compression springs that are interposed between fins 27 and 47.

The amplitude of deformation is necessarily limited because the springs cannot be compressed fully.

Furthermore, the elements 17 and 26 ought to have low-friction guidance, but they do not, so there is therefore a high risk of seizing.

In that construction, the radial force of the belt is supported by the ball bearing 50 which has a large offset.

The above analysis shows that:

freewheel devices are too rigid once locked, and their effectiveness depends on the opposing torque;

resilient pulleys do not enable the driven member to continue its motion in the event of deceleration; the internal friction is harmful to filtering; and pulleys with a resilient clutch using a spring are complex and have the same friction problem; they are also bulky.

OBJECTS AND SUMMARY OF THE INVENTION

The present invention enables at least some of the above drawbacks to be avoided by associating in series a freewheel (e.g. using balls or needles) and a resilient element of stiffness adapted to decoupling. The radial load is supported by a ball bearing that is generally centered relative to the belt so that it is subjected to little offset. The mechanical connection is established via the resilient element only when the freewheel is in its locked mode. In unlocked mode, e.g. when the driving element is slowing down, the driven member continues to rotate freely as a function of its own inertia.

The invention thus provides a power transmission pulley for a belt-driven accessory, the pulley comprising a pulley element with a ribbed outer outline that is adapted to receive a belt, and a resilient element interposed between the pulley element and a receiver device for coupling to a member driven by the belt, the pulley including a freewheel device using balls, rollers, or cams disposed in series with the resilient element between the pulley element and said shaft.

The freewheel device may be disposed between the pulley element and the resilient element which is secured to said receiver device, or the freewheel device may be disposed between the resilient element and said shaft, the resilient element being secured to the pulley element.

Advantageously, at least one bearing, e.g. a ball bearing or a needle bearing, is interposed between the ribbed outer outline and either a nut for coupling to a shaft coupled to said member, or else said shaft (when the pulley is mounted thereon).

The resilient element may comprise at least one elastomer part. It may be a spring, e.g. a spiral spring.

The invention also relates to a system including at least one accessory-decoupling pulley as defined above.

BRIEF DESCRIPTION OF THE DRAWINGS

Other characteristics and advantages of the invention appear more clearly on reading the following description in association with the drawings, in which.

MORE DETAILED DESCRIPTION

Figure 1:
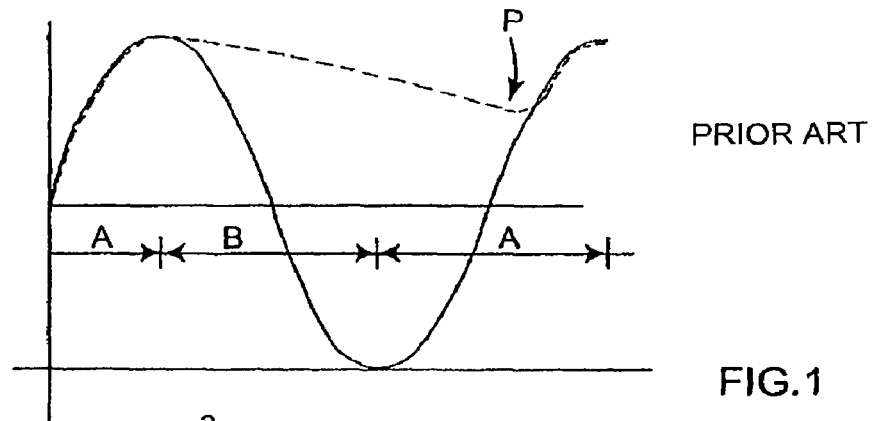
FIG. 1 reproduces FIG. 2 of above-mentioned U.S. Pat. No. 4,725,259.
Figure 2:
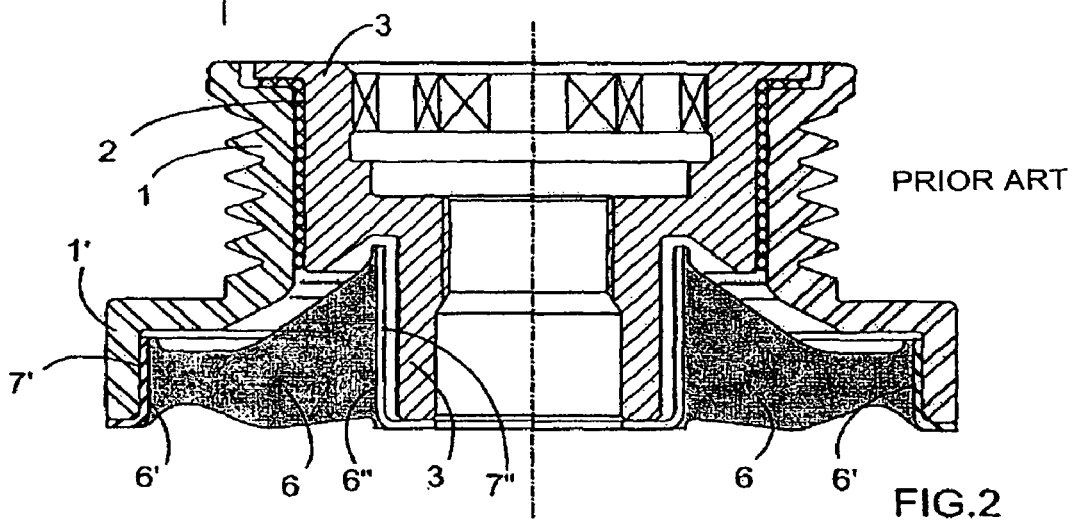
FIG. 2 shows an example of a known resilient pulley.
Figure 3:
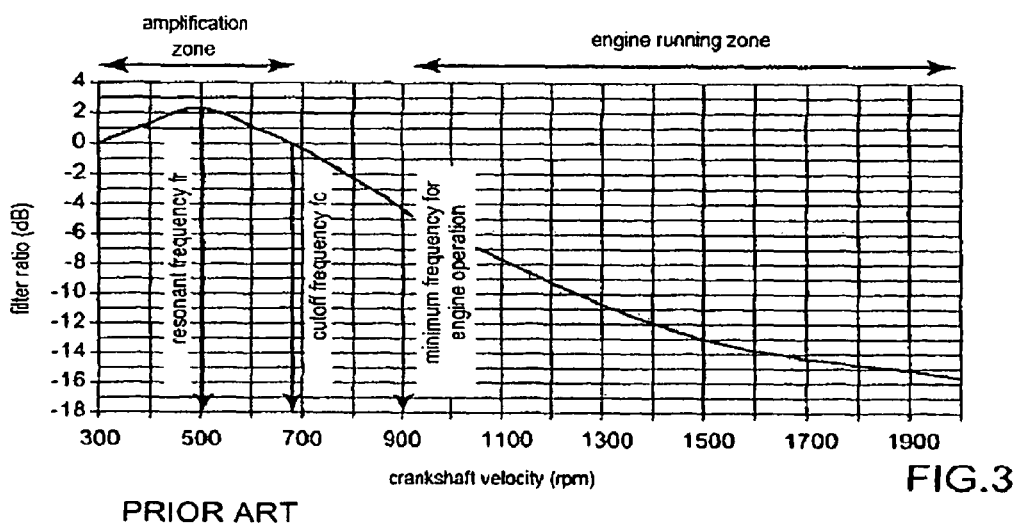
FIG. 3 showing its frequency response with filter ratio (dB) plotted up the ordinate as a function of crank shaft velocity (rpm) plotted along the abscissa.
Figure 4:
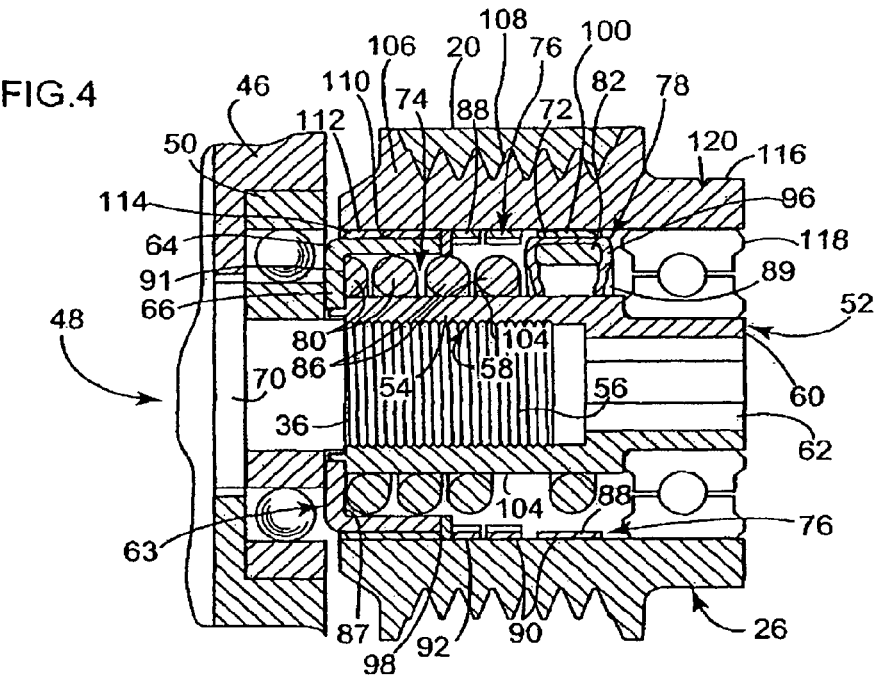
FIG. 4 reproduces FIG. 2 of above-mentioned U.S. Pat. No. 6,083,130.
Figure 5A:
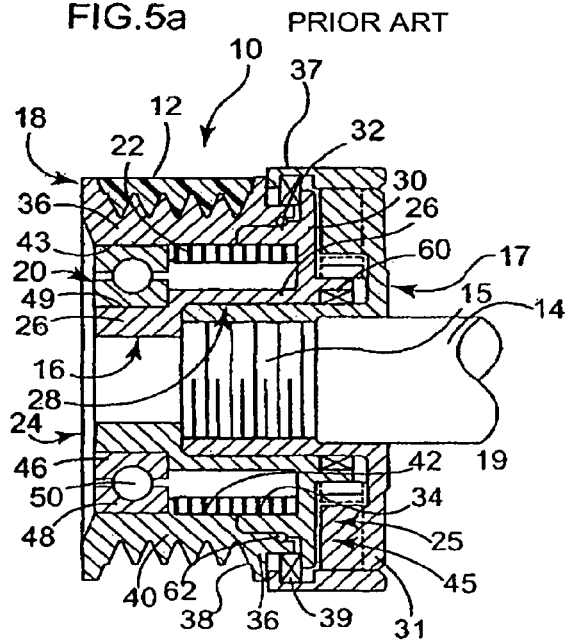
FIGS. 5a and 5b reproduce FIGS. 2 and 3 of above-mentioned U.S. Pat. No. 6,394,248.
Figure 5B:
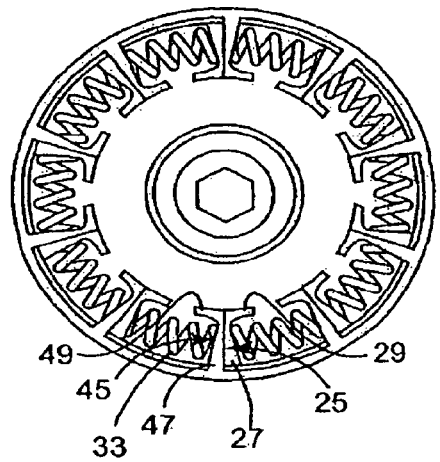

In FIGS. 6a to 6c and 7, the part 200 is a receiver pulley element presenting an outer outline 201 that receives the ribs of a belt, e.g. a V-ribbed or trapezoidal belt. The part 202 is a ball bearing. It is preferably placed under the rib 201 of the part 200 so as to avoid any axial offset, thus avoiding any need for an additional bearing. The ball bearing 202 takes up all of the radial and axial forces. It would be possible to use more than one bearing. The part 203 is a nut which serves firstly to provide a connection with a receiver shaft 221 of an accessory, e.g. an alternator having one end situated beside the receiver pulley element 200 ribbed at 201, and a race of a ball, needle, or cam freewheel 204 interposed between a decoupler body 206 and the nut 203. For this purpose, the outer outline 206' of the decoupler body 206 is bonded to a part 207 secured to an extension 211 of the receiver pulley 200, and the inner outline 206" is bonded to an inner strength member 209 of the decoupler body 206.

With this construction, the freewheel function and the load takeup function are completely dissociated. The freewheel 204 is not subjected to any axial or radial force, unlike freewheel pulleys of the prior art.

An optional insert, e.g. a lip seal 220 (FIG. 6a), mounted tightly on the part 209 can serve to take up any longitudinal slack between the outer cage of the freewheel and the strength member 209 of the decoupler body 206.

Thus, the same freewheel element 204 can be adapted to decoupler bodies of differing shapes.

The rubber decoupler body 206 serves, during operation, both to provide a resilient function (because it is elastic) and also a damping function (hysteresis) by a viscous effect.

Figure 6A:
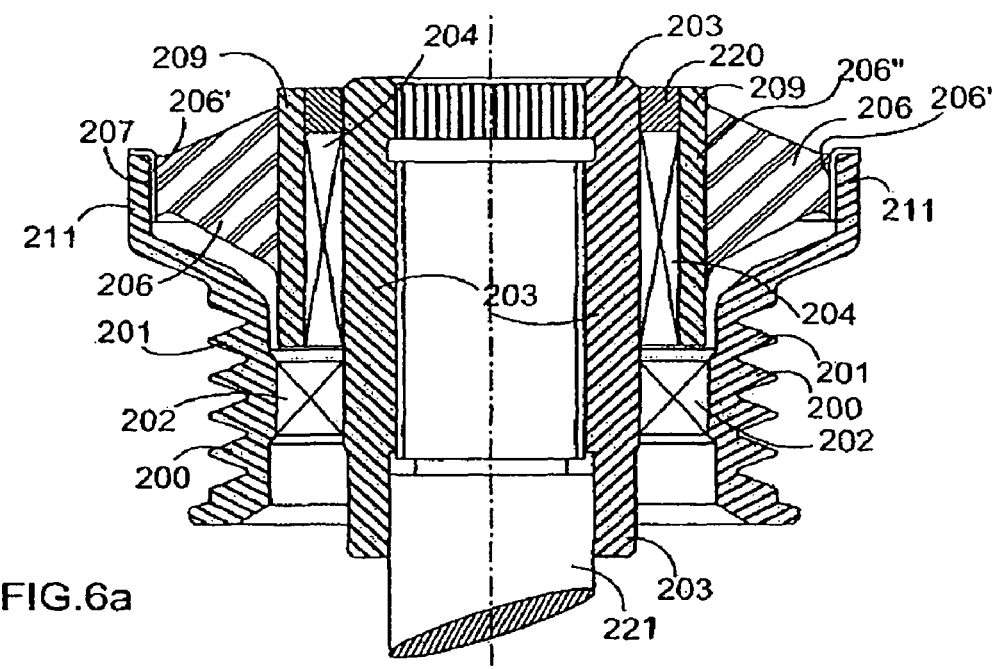
FIGS. 6a to 6c, 7, and 8 show variant pulleys of the invention.
Figure 6B:
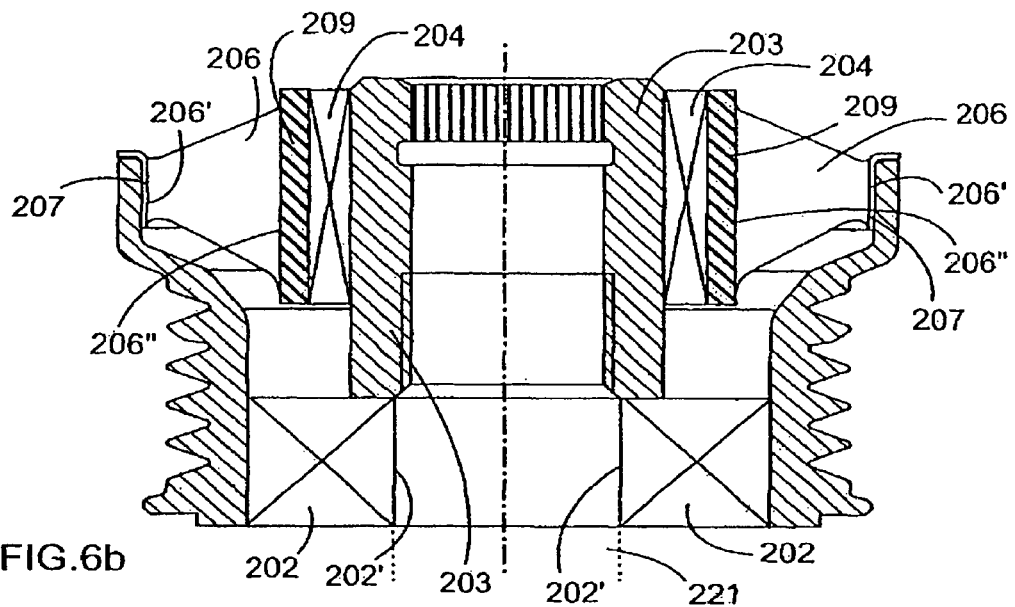
Figure 6C:
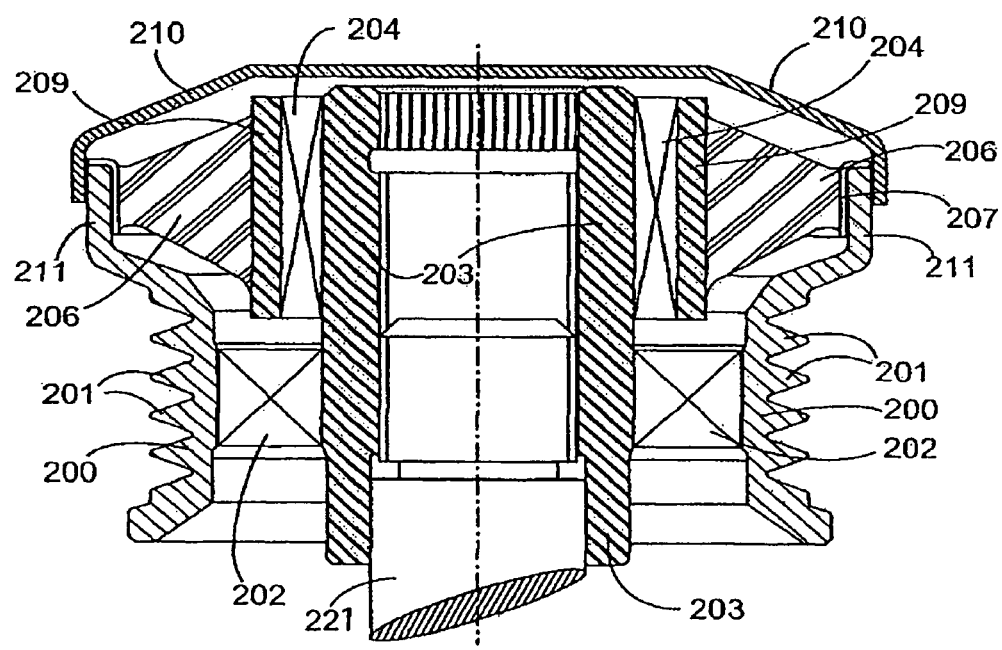

FIGS. 6a to 6c show variants with different dispositions for the freewheel 204 and the bearing 202.

As shown in FIG. 6c, a protective cap 210 and appropriate gaskets can be placed at the free end where the freewheel 204 and the decoupler body 206 are located.

Figure 7:
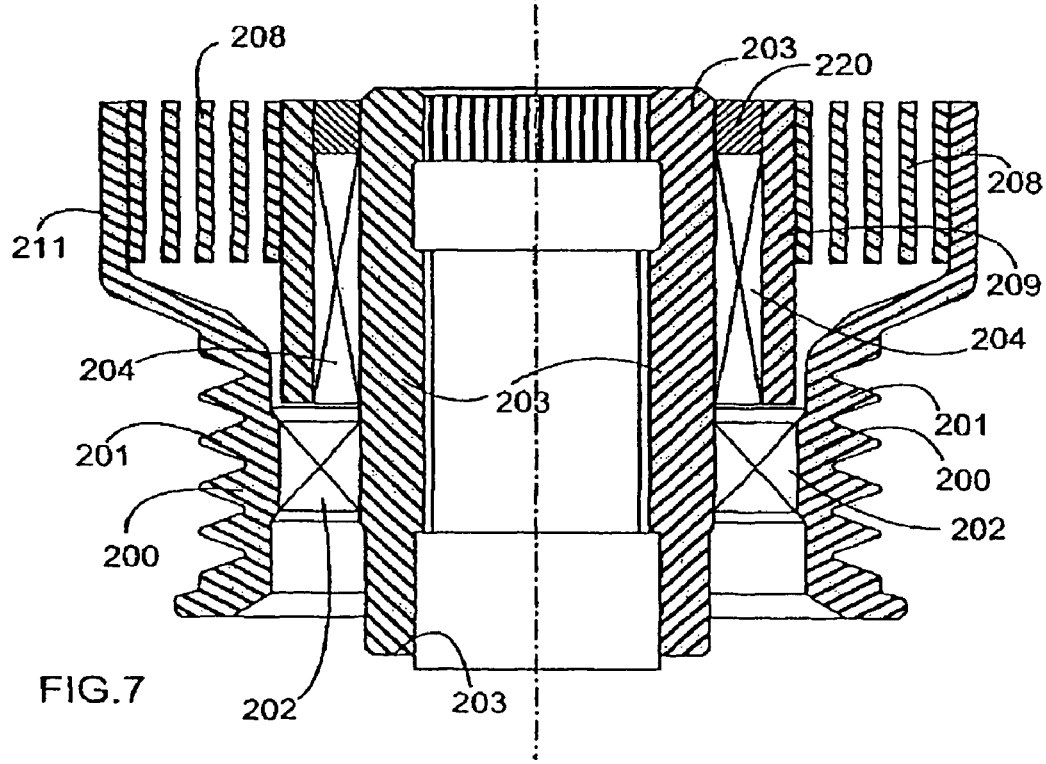

The decoupling function can also be performed by a metal spring, e.g. a spiral spring 208 (FIG. 7).

FIGS. 6a to 6c and 7 show that it is possible to use various types of rolling bearing (ball bearings, needle bearings, etc.). The bearing is either mounted on the nut 203 (as shown in FIGS. 6a, 6c, and 7) or else it is directly guided on the receiver shaft 220 via its inner outline 202' (FIG. 6b).

It is also possible to place the freewheel 204 at the periphery of the rubber body 206, i.e. between the body 206 and the extension 211.

This construction is simple and requires few parts.

Under all circumstances, the device described enables a decoupling effect to be obtained even when the receiver member delivers an opposing torque, and that is not true of prior art freewheels.

The freewheel overrunning serves to release the connection between the decoupler and the shaft, and thus to eliminate resonance.

If the decoupling effect is not essential, it is possible for the flexible element to be given stiffness suitable for damping the changes of state of the freewheel.

There is no internal friction since radial loads are taken up via a rolling bearing (ball bearing, etc.), and not via a smooth bearing.

The device of the invention makes it possible to separate the functions of taking up the load (radial/axial) and the freewheel function.

The shape and the mechanical properties of the decoupling element can be adapted without needing to redesign the freewheel or the rolling bearing.

The invention can be implemented in modular manner, with common components being reused.

The amplitude of deflection of the resilient element is not limited, unlike certain prior art pulleys which include abutments, or which have springs with touching turns.

Furthermore, because of the freewheel overrunning, the amplitude of deformation is restricted solely to the portion that is of use for filtering purposes, so fatigue of the flexible element is reduced.

The invention is applicable to power transmissions using belts (diesel or gasoline engines), and more generally to all circumstances in which fluctuations of velocity and torque are encountered.

When the freewheel is locked, the resilient element comes into play. It then withstands the opposing torque generated by the driven member. This leads to some mean level of deformation of the resilient element, in addition to the dynamic torque fluctuations due to velocity variation. These fluctuations lead to fluctuation in the deformation of the resilient element about the mean position.

In unlocked mode, the freewheel cannot transmit torque, thus making it possible to limit the amplitudes a of the angular deformation of the resilient element (by peak-limiting).

This overrunning serves to eliminate the resonance effect that is observed in decouplers. As soon as the deformation amplitude of the resilient element passes through zero, the freewheel unlocks and the resilient element no longer stores energy elastically.

Finally, when the velocity of the driving portion drops suddenly, the flexible element returns initially to its neutral position, and as a result the frictionless overrunning allows the driven element to continue turning as a function of its own inertia, since there is no energy stored in the flexible element at the moment the freewheel starts overrunning.

Figure 8:
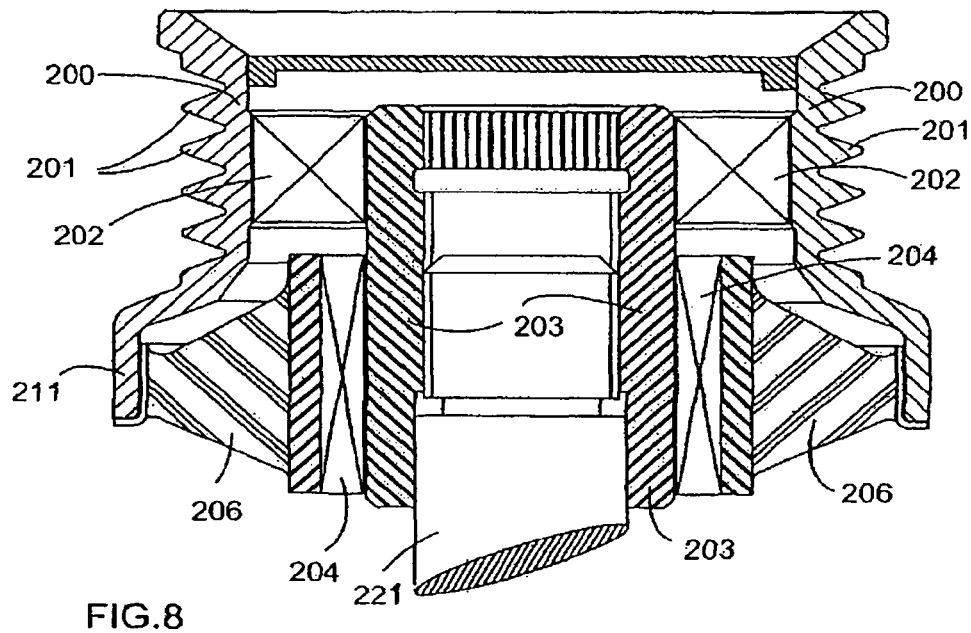

FIG. 8 shows a variant in which the freewheel device 204 and the resilient element are placed beside the connection between the pulley and the shaft 220 of the driven accessory while the receiver pulley element 200 that is ribbed at 201 is disposed remote from the connection between the pulley and the shaft 221.

Surprisingly, the present invention makes it possible to increase the stiffness of the resilient element.

In an automobile belt transmission device, the succession of inertias and stiffnesses creates an oscillating mechanical system that possesses a set of resonances. The term "resonance" designates the fact that the angular velocities of the rotary members are amplified.

Since the drive motion is pseudo-sinusoidal because of the velocity instabilities of the engine, it presents a frequency that varies together with varying engine speed and that sweeps through a broad range of frequencies, thereby passing through all of the resonant frequencies of the transmission system.

The term "response" designates all of the dynamic manifestations of the behavior of the system. Resonances lead to large dynamic forces or to strands of the transmission belt flapping, or indeed to tensioners moving, and sometimes all of that at once.

Figure 9:
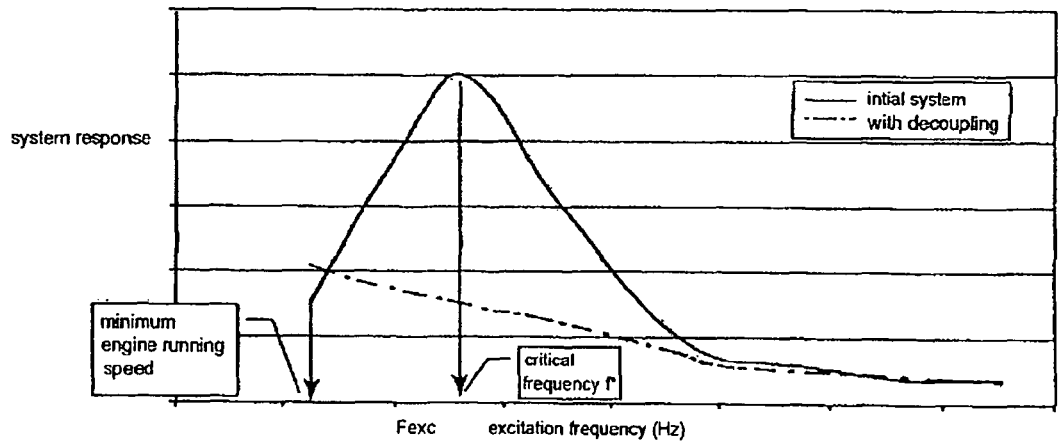
FIG. 9 is a graph showing a typical response curve of a transmission system.

The curve in FIG. 9 shows the general appearance of responses as a function of excitation frequency. The excitation frequency is proportional to the number of cylinders and to the mean velocity of rotation of the crank shaft.

The critical frequency f* may be one of the resonant frequencies of the system. The response is of large amplitude since the excitation generated by the engine delivers energy to the system in resonance.

In other circumstances, f* may also be the frequency at which the amplitude of excitation from the engine is at its greatest.

With diesel engines, and in particular with direct injection engines, the greatest levels of velocity instability are generally to be found in the range 20 Hz to 60 Hz.

It is also in this frequency range that it is common to find resonant frequencies in a belt transmission system.

There is thus a high risk of the two frequencies coinciding. When excitation is high and coincides with a resonant frequency, the system is not viable.

In FIG. 9, the response at the critical frequency f* is assumed to exceed the level that can be accepted by the system (risk of its function becoming degraded or even completely lost). One of the solutions known to the person skilled in the art thus consists in elastically decoupling the portion of the system that is responsible for this amplification.

The stiffness selected for the resilient element must satisfy requirements both relating to decoupling and to durability.

In the prior art, the stiffness of the decoupling system has been selected so that the cutoff frequency f* of the resilient pulley is always below the critical frequency f*. This is referred to as "frequency blocking". Thus, when the engine is running at about f*, the response of the system is much smaller than it would have been without the decoupling system.

This situation amounts to writing:

$$fc \leq f^* \qquad (1)$$

Furthermore, a rule that is well known to the person skilled in the art (oscillating systems theory) associates fr and fc as follows:

$$fc = \sqrt{2} fr \qquad (2)$$

There is also a well-known relationship associating fr, the stiffness k of the decoupling, and the inertia I of the accessory to be decoupled:

$$fr = \frac{1}{2\pi} \sqrt{\frac{k}{I}} \qquad (3)$$

From these two relationships, the person skilled in the art generally obtains a functional criterion concerning the maximum stiffness k not to be exceeded in order to ensure that decoupling continues to be effective:

$$k \leq 2\pi^2 (f^*)^2 I \qquad (4)$$

Thereafter, the requirement for durability makes it possible to set a bottom value for k that depends on the torque to be transmitted, and also on the behavior of the materials contributing to the stiffness (elastomer disk, metal spring).

In the prior art, and more particularly in the field of belt transmissions for motor vehicles involving a decoupled alternator, it is found that k can be reduced down to 0.15 Nm/°, but that the associated deformation is large and endangers the strength of the resilient element.

Under such circumstances, the opposing torque created by the member (a high-power alternator) is such that the stiffness k defined by equation (4) does not enable a viable system to be defined.

By way of example, consider a 4-cylinder diesel engine running at 600 rpm with a frequency of 20 Hz being specifically the frequency f* that gives rise to a problem.

The alternator has inertia of 3 gram meters squared (g.m$^2$) and delivers a nominal electrical torque of 14 Nm.

The functional stiffness k according to equation (4) needs to be less than 23.7 Nm/radian, or in conventional units less than 0.41 Nm/°.

Under the effect of the torque of 14 Nm, and with such stiffness, the nominal angular deformation would thus be 34° (not counting the additional dynamic deformation around this nominal value associated with the inertia and the angular acceleration of the sinusoidal signal). The shape of the decoupler element is such that for such an angle, the elongation in its material exceeds the capacity of that material. It is therefore important to increase its stiffness so as to reduce the nominal deformation angle and the angle given by the additional dynamic effect. Unfortunately, because of the need to provide decoupling as defined by equation (1), it is not possible to increase stiffness (and thus fr or fc).

One of the advantages of the invention lies in peak-limiting the phenomenon of resonance.

Since the motion cannot increase to infinity, overrunning over a fraction of the oscillation immediately cuts off any exaggerated amplification of the vibration.

In situations in which the prior art decoupler pulley enters into resonance (leading to destruction), the pulley of the invention limits the resonance peaks of the resilient element and is protected from damage by overrunning.

Thus, the cutoff frequency fc of the resilient decoupler need not satisfy equation (1) given above.

The invention makes it possible to be less well "blocked" in terms of frequency and broadens the criterion for positioning the resonant frequency of the decoupler.

By interposing a freewheel in series with the resilient decoupler stage, it is possible to select a stiffness k for this resilient decoupler stage that is higher than is possible in the prior art.

As a result, under the effect of the opposing toque, the amount of deformation to which the resilient decoupler element is subjected becomes smaller, thereby increasing its durability.

Naturally, the peak-limiting capacity of the freewheel is limited. In particular, if the opposing torque of the driven member is superposed on the dynamic torque, then overrunning becomes less frequent and only a portion of the oscillation is peak-limited.

It is not desirable for the stiffness k to be too high, since otherwise that leads to the same drawbacks as occur in prior art freewheel pulleys (which correspond to an infinite value for k).

A good compromise between these two situations is to set a new maximum limit for fc as follows:

$$fc \leq 2f^*, \text{ i.e. } k \leq 8\pi^2(f^*)^2 I \qquad (5)$$

and preferably;

$$fc \leq 1.5 f^*, \text{ i.e. } k \leq 4.5\pi^2(f^*)^2 I \qquad (6)$$

and in either case k can preferably be greater than $2\pi^2(f^*)^2 I$.

Returning to the example of a 4-cylinder diesel engine running at 600 rpm, with the frequency of 20 Hz being specifically the frequency f* that gives rise to a problem:
- the alternator has inertia of 3 g.m² and delivers a torque of 14 Nm; and.
- the functional stiffness k according to equation (6) must be less than 53.3 Nm/rad, or in conventional units 0.93 Nm/°.

Under the effect of the torque at 14 Nm, and with such stiffness, the angular deformation is thus 15° (instead of 34° as above). The same shape for the decoupler element therefore leads to elongation that is less than in the prior art.

It should be observed that in order to avoid any phenomenon of noise at high speed, it can be desirable to brake the freewheel a little, in a manner that is itself well known, e.g. from PCT application No. WO 03/036114.

What is claimed is:

1. A power transmission pulley for decoupling a belt-driven accessory, the pulley comprising:
   - a driving pulley element having an outer outline that is adapted to receive a belt, and
   - a resilient element interposed between the driving pulley element and a receiver device for being coupled to said accessory,
   - the pulley including a freewheel device of a ball, needle, or cam type disposed in series with the resilient element between the driving pulley element and said receiver device, the freewheel device serving to transmit power so long as the driving pulley element is driven by the belt, and serving to decouple the freewheel device when the driving pulley element is no longer driven by the belt, wherein the stiffness k of the resilient element satisfies the following relationship:

$$k \leq 8\pi^2(f^*)^2 I$$

where f* designates a critical frequency of the system that is a frequency whereby a system response is the greatest and I designates the inertia of the accessory to be decoupled and further wherein:

$$2\pi^2(f^*)^2 I < k.$$

2. A pulley according to claim 1, wherein the freewheel device is disposed between the resilient element and said receiver device, the resilient element being secured to the pulley element.

3. A pulley according to claim 2, wherein the freewheel device is mounted on a nut for receiving a shaft coupled to said accessory.

4. A pulley according to claim 1, wherein the freewheel device is disposed between the pulley element and the resilient element, and the resilient element is secured to said receiver device.

5. A pulley according to claim 4, wherein the resilient element is secured to a nut for receiving a shaft coupled to said accessory.

6. A pulley according to claim 1, presenting at least one rolling bearing interposed between said ribbed outer outline and a nut for receiving a shaft coupled to said accessory.

7. A pulley according to claim 6, wherein at least one said bearing is a ball bearing or a needle bearing.

8. A pulley according to claim 1, presenting at least one rolling bearing situated inside said ribbed outer outline and presenting an inner outline suitable for being guided on a shaft coupled to said accessory.

9. A pulley according to claim 1, wherein the resilient element comprises at least one elastomer part.

10. A pulley according to claim 1, wherein the resilient element is a spring.

11. A pulley according to claim 10, wherein the spring is a spiral spring.

12. A pulley according to claim 1, wherein said accessory is an alternator of a motor vehicle.

13. A transmission system, including at least one accessory decoupling pulley according to claim 1.

14. A system according to claim 1, wherein:

$$k \leq 4.5\pi^2(f^*)^2 I.$$

15. A pulley according to claim 1, wherein $20 \text{Hz} \leq f^* \leq 60$ Hz.

* * * * *